UNITED STATES PATENT OFFICE.

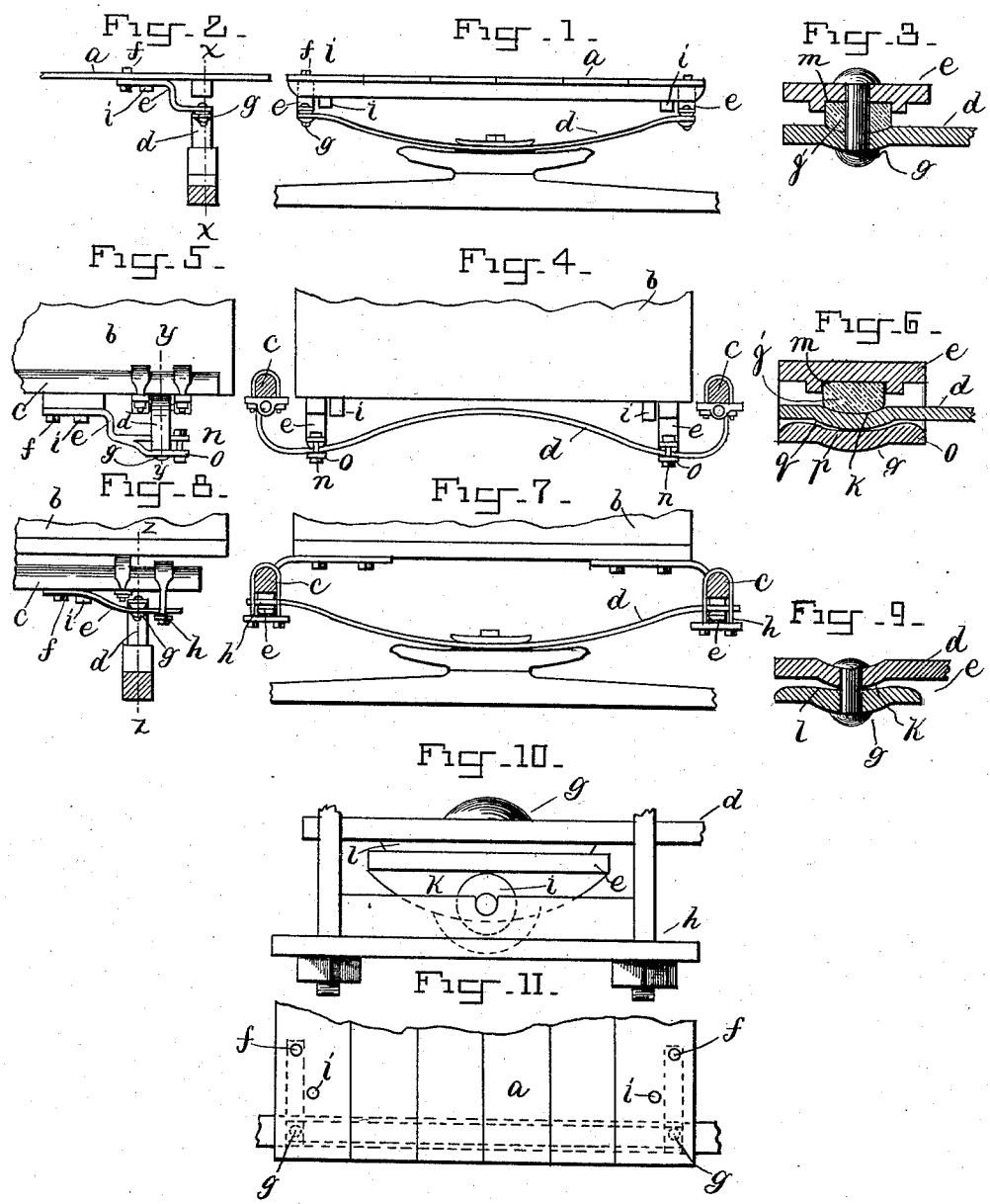

GEORGE T. CHAPMAN, OF WHITE PLAINS, ASSIGNOR OF ONE-HALF TO WM. HARVEY MERRITT, OF NEW YORK, N. Y.

SPRING ATTACHMENT FOR VEHICLES.

SPECIFICATION forming part of Letters Patent No. 477,622, dated June 21, 1892.

Application filed January 28, 1892. Serial No. 419,503. (No model.)

*To all whom it may concern:*

Be it known that I, GEORGE T. CHAPMAN, a citizen of the United States, and a resident of White Plains, in the county of Westchester and State of New York, have invented certain new and useful Improvements in Spring Attachments for Vehicles, of which the following is a specification.

My invention relates more particularly to buckboard and side-bar wagons, but is also applicable to others, and also to street-cars having semi-elliptic springs supporting the bodies on the running-gear; and it consists in an improved mode of connecting the buckboard or body to the spring or springs for greater facility of the elongations and contractions of the springs lengthwise and easier motions of the body than as commonly mounted on the springs, all as hereinafter fully described, reference being made to the accompanying drawings, in which—

Figure 1 is a front elevation of part of a buckboard-wagon in which the buckboard is mounted according to my invention. Fig. 2 is a side elevation of a portion of the apparatus of Fig. 1. Fig. 3 is a detail of Figs. 1 and 2, in section, on line $x\ x$, Fig. 2, enlarged. Fig. 4 is a front elevation of a portion of a wagon, showing the body mounted on a spring in accordance with my invention, the spring being supported on side bars in a common way. Fig. 5 is a side elevation of part of the apparatus of Fig. 4. Fig. 6 is a detail of Figs. 4 and 5, in section, on line $y\ y$, Fig. 5, enlarged. Fig. 7 is a front elevation of part of a side-bar wagon, showing the side bars mounted on the spring in accordance with my invention. Fig. 8 is a side elevation of part of the apparatus of Fig. 7. Fig. 9 is a detail of Figs. 7 and 8 on line $z\ z$, Fig. 8, enlarged. Fig. 10 is a detail of the apparatus of Figs. 7 and 8, in elevation, on an enlarged scale; and Fig. 11 is a plan view of part of the buckboard of Figs. 1 and 2.

The buckboard $a$, body or box $b$, and side bars $c$ of a wagon, or it may be the body of a car or other carriage, will according to my invention be mounted on the spring $d$, through the instrumentality of bearing-brackets, as $e$, in various modes of application, according to the different requirements of the case, but so that said brackets will allow the spring to contract and elongate freely, which is accomplished by the joints of said brackets with the buckboard-body or side bar, as $f$, and with the spring, as $g$, being so that they may vibrate slightly on the fastening bolts or rivets connecting them with the body and springs, which allows the two brackets connecting the body and the spring to swing apart when the spring elongates and toward each other when the spring shortens, the said brackets consisting of short steel plates extending laterally to the spring from each end, where they are jointed to it, to the point of connection with the buckboard-body or other part at such length as is suitable for affording the requisite play of the springs. The said brackets are bent suitably to extend downward from the plane of the under side of the buckboard or other part to which they are attached to have connection with the spring sufficiently lower to prevent contact of the buckboard or other part with the spring.

In the case of the buckboard the brackets are mounted directly on the ends of the spring, as in Figs. 1, 2, 3, and 11; but in the case of a spring suspended from the side bars, as in Figs. 4 and 5, the bearings of said brackets on the spring are located at suitable distances from the ends, and in another arrangement for side bars the brackets may be supported at one end in a clip $h$, pendent from the side bar, and have the ends of the spring supported on them, as in Figs. 7 and 8, the said ends of the brackets resting in said clips, being free to vibrate therein, and may be mounted on a roll $i$, as shown in Fig. 10, to work easy. At the joints of the brackets with the springs one has a concave seat, as $k$, and the other a convex bearing, as $l$, when one bears directly on the other, as in Fig. 9, to facilitate such rocking motion of one on the other as the parts may be subject to in use. A rubber washer, as $j$, may be introduced between the parts at the joints, if desired, in which case the bracket will have a recessed seat, as $m$, to confine the rubber washer.

To prevent the body or buckboard from lurching sidewise on the bearing-brackets, stops, as $i$, Figs. 1, 2, 4, and 5, may be employed to confine the body or buckboard centrally on the brackets. In the arrangement of Figs. 7, 8, and 10 the clips $h$ confine the brackets, so as to prevent such action.

When the bracket is to connect with a spring suspended at the ends, as in Figs. 4 and 5, or in any way rendering it desirable to avoid perforating the spring for the fastening bolts or rivets, the brackets may be forked at the end connecting with the spring and be clamped thereon by bolts $n$, as in said figures. The prong $o$ may have a cavity $p$ in the upper side, hugging the convexity $q$ of the under side of the spring, to serve, in addition to the concave seat $k$, holding the rubber disk, to prevent the bracket shifting along the spring.

The bracket and the spring may both have convex bearing parts in contact, if desired, to facilitate the rocking motion.

I claim—

1. The body of a carriage or other vehicle mounted on a semi-elliptic spring by laterally-extending bearing-brackets connected at or near one end to the spring and at or near the other end to the body with joints permitting said bearing-brackets to vibrate sidewise, substantially as described.

2. The body of a carriage or vehicle mounted on a semi-elliptic spring by laterally-extending bearing-brackets connected at or near one end to the body by a joint permitting vibration and near the other end connected to the spring and thereat having support allowing it lateral play, substantially as described.

Signed at New York city, in the county and State of New York, this 22d day of January, A. D. 1892.

GEO. T. CHAPMAN.

Witnesses:
W. J. MORGAN,
CLINTON E. WHITNEY.